US008162431B2

(12) United States Patent
Sjolander et al.

(10) Patent No.: US 8,162,431 B2
(45) Date of Patent: Apr. 24, 2012

(54) SYSTEM AND METHOD FOR DETECTING WEAK AND MISSING INK JETS IN AN INK JET PRINTER

(75) Inventors: Cary Eric Sjolander, Tigard, OR (US); Keith W. Ragsdale, Tigard, OR (US); Kathleen M. Faraci, Newberg, OR (US); Heidi P. Noce, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 382 days.

(21) Appl. No.: 12/419,665

(22) Filed: Apr. 7, 2009

(65) Prior Publication Data

US 2010/0253732 A1 Oct. 7, 2010

(51) Int. Cl.

| | |
|---|---|
| ***B41J 29/393*** | (2006.01) |
| *G06K 15/00* | (2006.01) |
| *G06K 9/00* | (2006.01) |
| *H04N 1/405* | (2006.01) |
| *H04N 1/46* | (2006.01) |

(52) U.S. Cl. ......... 347/19; 358/3.13; 358/504; 358/514; 382/112

(58) Field of Classification Search .................... 347/19; 358/3.13, 504, 514; 382/112

See application file for complete search history.

(56) References Cited

U.S. PATENT DOCUMENTS

| | | | | |
|---|---|---|---|---|
| 5,736,996 | A | 4/1998 | Takada et al. | |
| 6,610,972 | B2 * | 8/2003 | Perregaux | 250/208.1 |
| 6,637,853 | B1 | 10/2003 | Ahne et al. | |
| 6,789,870 | B2 | 9/2004 | Barnes et al. | |
| 6,832,824 | B1 | 12/2004 | Baker et al. | |
| 7,021,732 | B2 * | 4/2006 | Folkins | 347/8 |
| 7,154,110 | B2 * | 12/2006 | Mizes et al. | 250/559.1 |
| 7,256,411 | B2 * | 8/2007 | Mizes et al. | 250/559.1 |
| 7,264,328 | B2 * | 9/2007 | Folkins et al. | 347/19 |
| 7,278,699 | B2 * | 10/2007 | Drake et al. | 347/13 |
| 7,300,133 | B1 * | 11/2007 | Folkins et al. | 347/19 |
| 7,427,118 | B2 | 9/2008 | Mizes et al. | |
| 2004/0136612 | A1 * | 7/2004 | Meister et al. | 382/299 |
| 2005/0018006 | A1 * | 1/2005 | Im et al. | 347/19 |
| 2005/0099447 | A1 * | 5/2005 | Hsu et al. | 347/19 |
| 2006/0098251 | A1 * | 5/2006 | Eklund et al. | 358/504 |
| 2006/0114284 | A1 * | 6/2006 | Mizes et al. | 347/19 |
| 2009/0040261 | A1 * | 2/2009 | Zhang et al. | 347/19 |
| 2010/0219328 | A1 * | 9/2010 | Ruff et al. | 250/208.1 |

* cited by examiner

*Primary Examiner* — Laura Martin
*Assistant Examiner* — Jeremy Bishop
(74) *Attorney, Agent, or Firm* — Maginot, Moore & Beck, LLP

(57) ABSTRACT

A method detects weak or missing ink jets in an ink jet image generating system. The method includes generating a digital image of a test pattern of line segments in a process direction on an image receiving member with each line segment corresponding to one ink jet in a printhead, generating a response profile for a portion of the image receiving member on which the test pattern was generated, measuring the response profile, comparing the measurement of the response profile to a predetermined threshold, identifying missing and weak ink jets in response to the measurement of the response profile being less than the predetermined threshold, and moving the support member transversely across the process direction to a second position that enables each light sensor to image another portion of the image receiving member.

9 Claims, 6 Drawing Sheets

SYSTEM AND METHOD FOR DETECTING WEAK AND MISSING INK JETS IN AN INK JET PRINTER

TECHNICAL FIELD

This disclosure relates generally to devices that generate images, and more particularly, for imaging devices that eject ink from ink jets to form an image.

BACKGROUND

Ink jet imaging devices eject liquid ink from printheads to form images on an image receiving member. The printheads include a plurality of ink jets that are arranged in some type of array. Each ink jet has a thermal or piezoelectric actuator that is coupled to a printhead controller. The printhead controller generates firing signals that correspond to digital data for images. The frequency and amplitude of the firing signals correspond to the selective activation of the printhead actuators. The printhead actuators respond to the firing signals by ejecting ink drops onto an image receiving member to form an ink image that corresponds to the digital image used to generate the firing signals.

Throughout the life cycle of these ink jet imaging devices, the image generating ability of the device requires evaluation and, if the images contain detectable errors, correction. Missing ink jets or weak ink jets are an error condition that affects ink image quality. A missing ink jet is an ink jet that does not eject an ink drop in response to a firing signal. A weak ink jet is an ink jet that responds intermittently to a firing signal or that responds by ejecting ink drops having a mass that is less than the ink drop mass corresponding to the characteristics of the firing signal for the ink jet. Systems and methods have been developed that compensate for missing or weak ink jets, but the missing or weak ink jets must be detected before these systems and methods can be activated.

Detection of missing and weak ink jets is made difficult by the surface characteristics of the image receiving member. In some ink jet imaging devices, the ink is ejected onto a media substrate and the ink image is fused onto the sheet. The sheet is ejected and then imaged by illuminating the surface of the sheet and generating an electrical signal that corresponds to the intensity of the light reflected from the surface. The signal is generated by a photo detector that is positioned to receive light reflected from a small portion of the image surface. By arranging a plurality of photo detectors across the width of a media sheet, the entire width of the sheet may be used to generate reflected light received by the photo detectors. The responses of the photo detectors produce a digital image corresponding to the ink image on the media sheet. The ink drops on the sheet reflect light at an intensity that is different than the positions on the sheet that do not have ink on it. In other ink jet imaging devices, the ink is ejected onto a rotating image member, such as an anodized drum or an endless belt, and the ink image formed on the belt is transferred to a media sheet by forming a nip with a pressure roller and synchronizing the delivery of the media sheet to the nip to coincide with the arrival of the image on the rotating image member at the nip. In these types of devices, the ink image may be imaged from the media sheet to check for missing or weak jets. Alternatively, the ink image on the rotating imaging member may be illuminated and the reflected light used to generate a digital image that corresponds to the ink image on the rotating image member.

Evaluating a digital image produced by illuminating an image member can be difficult because the surface of the image member may generate noise in the digital image. For example, the random structure in a media sheet or anodized drum may reflect light away from a photo detector and emulate the amount of light reflected by an ink drop, which absorbs light. Consequently, systems and methods analyzing digital images of ink images on an image substrate to detect missing or weak ink jets need to be able to distinguish structure in the image substrate from the absorption of light by an ink drop. Another source of noise is the location of ink drops in the test pattern formed on an image member. The image of the test pattern on the image member may be captured by a plurality of light sensors, such as photo detectors, arranged linearly across the image receiving member. If an ink drop being imaged lies on a boundary of a field of vision for two adjacent light sensors, then the light absorbed by the ink drop may not be fully detected by either light sensor.

Before an ink jet imaging device leaves a manufacturing facility, the device should be tested to determine whether the printhead has a number of missing or weak jets that would adversely affect image quality. Additionally, ink jets in the printheads of an ink jet imaging device may begin to exhibit missing or weak ink jet characteristics. These changes arise because the device and its environment may experience temperature instabilities, dust, or other debris, which may cause components of the device to shift or operate unreliably. These conditions may cause the intrinsic performance of the device to change reversibly or irreversibly. Consequently, the ink jets of the printheads in an ink jet imaging device require evaluation at various intervals during the operational life of the device to detect changes in the performance of the ink jets. Sometimes these evaluations and adjustments are made at time or usage intervals, while at other times the adjustments are made during service calls made by trained technicians. Consequently, the ability to detect missing and weak ink jets in an ink jet imaging system is important.

SUMMARY

A method detects weak or missing ink jets in an ink jet image generating system. The method includes generating a test pattern of line segments in a process direction on an image receiving member with each line segment corresponding to one ink jet in a printhead, generating a digital image of the generated test pattern on the image receiving member from light reflected by the test pattern and the image receiving member to a plurality of light sensors linearly arranged on a support member that is transverse to the process direction, generating a response profile for a portion of the image receiving member on which the test pattern was generated, measuring the response profile, comparing the measurement of the response profile to a predetermined threshold, identifying missing and weak ink jets in response to the measurement of the response profile being less than the predetermined threshold, and moving the support member transversely across the process direction to a second position that enables each light sensor to image another portion of the image receiving member.

A system detects missing and weak ink jets in an ink jet image generating system in the presence of image receiving member noise. The system includes a test pattern generator configured to generate a test pattern of line segments in a process direction on an image receiving member with each line segment corresponding to one ink jet in a printhead, a plurality of light sensors linearly arranged along a support member that is transverse to the process direction, the plurality of light sensors configured to generate a digital image of the generated test pattern on the image receiving member from light reflected by the test pattern on the image receiving member, an image evaluator configured to generate a response for an ink jet that corresponds to a portion of the digital image of the test pattern on the image receiving member and to identify missing and weak ink jets from measurements of the response, an actuator coupled to the support member, the actuator being configured to move the support member transversely to the process direction, and a controller coupled to the image evaluator and the actuator, the controller configured to couple the actuator to electrical power and move the support member transversely to the process direction to a second position that enables each light sensor to image another portion of the image receiving member.

BRIEF DESCRIPTION OF THE DRAWINGS

The foregoing aspects and other features of a system and method that identify missing and weak ink jets in the presence of image receiving member noise are explained in the following description, taken in connection with the accompanying drawings.

DETAILED DESCRIPTION

Figure 1:
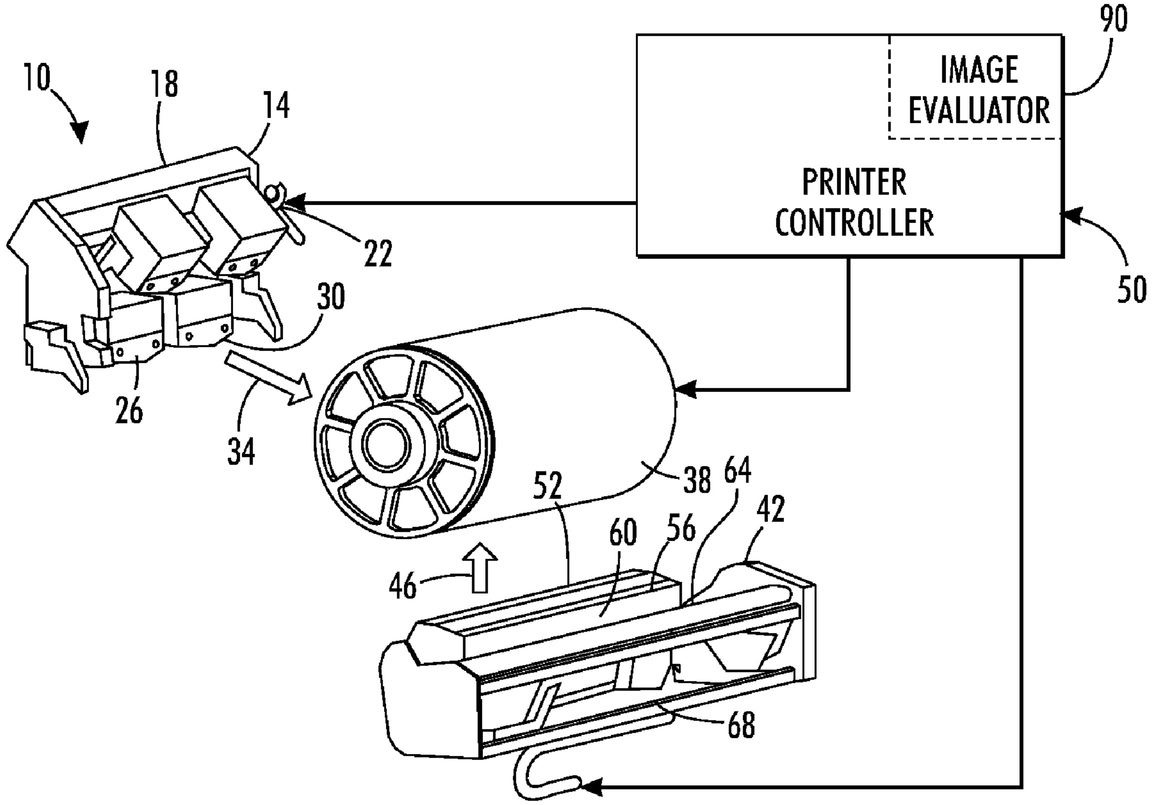
FIG. 1 is a schematic diagram of a printer depicting the components operated by a controller to identify missing and weak ink jets from a test pattern image on an image receiving member.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, or the like. Also, the description presented below is directed to a system for operating an ink jet printer to print test patterns on an image substrate and to analyze digital images of the test patterns. The reader should also appreciate that the principles set forth in this description are applicable to similar test pattern generators and digital image analyzers that may be adapted for use in any imaging device that generates images with dots of marking material.

As shown in FIG. 1, a particular image generating system may be a printer. The printer 10 includes a printhead assembly 14, a rotating intermediate imaging member 38, an image capture device 42, such as a scanner, and a printer controller 50. The printhead assembly 14 includes four printheads 18, 22, 26, and 30. Typically, each of these printheads ejects ink, indicated by arrow 34, to form an image on the imaging member 38. The four printheads are arranged in a two by two matrix with the printheads in one row being staggered with reference to the printheads in the other row. Controlled firing of the ink jets in the printheads in synchronization with the rotation of the imaging member 38 enables the formation of a single continuous horizontal bar across the length of the imaging member. The intermediate imaging member 38 may be a rotating drum, as shown in the figure, belt, or other substrate for receiving ink ejected from the printheads. Alternatively, the printheads may eject ink onto a substrate of media moving along a path adjacent to the printheads. The image capture device 42 includes a light source 52 for illuminating the imaging member 38, as indicated by arrow 46, and a set of electro-optical sensors 56 that are mounted to a support member 60. Each sensor generates an electrical signal having an amplitude that corresponds to the intensity of the reflected light received by a sensor. These signals form a digital image of an ink image on the image receiving member 38. The support member 60 is mounted on a bar 64 for reciprocating movement across the image receiving member 38 in a cross-process direction. An actuator 68, such as an electrical motor, is coupled to the support member 60, through gear trains, translational, or rotational linkages or the like to move the support member and the image capture device 42 across the image receiving member 38 in response to a signal from the controller 50. The actuator 68 responds to signals from the controller 50. A portion of the instructions executed by the controller 50 implement an image evaluator 90 that processes digital images of test patterns on the image receiving member to detect weak and/or missing ink jets. In response to the image evaluator detecting weak ink jets, the controller 50 generates an electrical signal for the actuator, such as stepper motor pulses or other control signals, which activate the actuator 68 to move the support member on which the sensors are mounted. The generation of the signal from the controller 50 and the processing of the digital image are discussed in more detail below.

The printer controller 50 includes memory storage for data and programmed instructions. The controller may be implemented with general or specialized programmable processors that execute programmed instructions. The instructions and data required to perform the programmed functions may be stored in memory associated with the processors or controllers. The processors, their memories, and interface circuitry configure the controllers to perform the functions, such as the test pattern generation and the digital image analysis, described more fully below. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

The controller 50 in FIG. 1 is coupled to the printhead assembly 14, the imaging member 38, and the image capture device 42 to synchronize the operation of these subsystems. To generate an image, the controller renders a digital image in a memory and generates ink jet firing signals from the digital image. The firing signals are delivered to the printheads in the assembly 14 to cause the ink jets to eject ink selectively. The controller is also coupled to the imaging member 38 to control the rate and direction of rotation of the imaging member 38. Controller 50 also generates signals to activate the image capture device for illumination of the imaging member 38 and generation of a digital image that corresponds to the image on the member 38. The digital image is received by the controller 50 for storage and processing.

To evaluate the quality of the images being generated in one embodiment, the controller 50 may execute programmed instructions that enable the printer to implement a plurality of processes for testing ink jets in the printheads and detecting missing and/or weak ink jets. In general, these processes result in the generation of ink images, called test patterns, on the imaging member 38, and the processing of the digital images generated by the image capture device 42 from the test pattern on the image receiving member. Although the description below is directed to a system in which the electro-optical sensor(s) used to image the test pattern on a rotating image member are integrated within the imaging system, the image may be generated by a scanner integrated in the image generating system or by a standalone scanner. These scanners may obtain a digital image from a media sheet on which the test pattern has been directly printed or to which the test pattern has been transferred from a rotating image member. The image data generated by the standalone scanner may be transmitted to a data connection of the imaging system for receipt and storage of the image in the system or the image may be stored on storage media and read by the imaging system for analysis. The processing of the scanned test pattern image enables the detection of missing and/or weak ink jets and the positioning of the electro-optical sensors to image the test pattern for better analysis.

Figure 2:
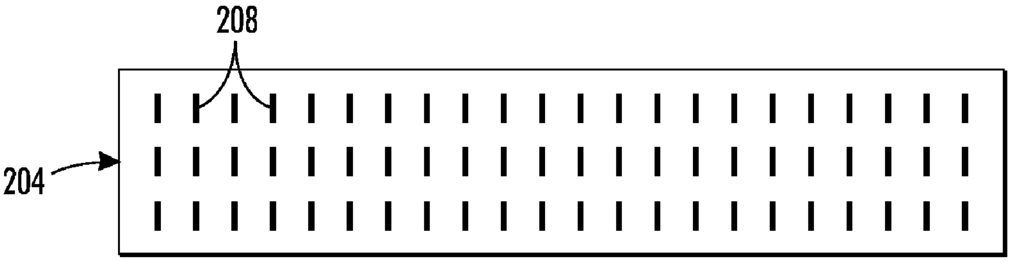
FIG. 2 is a portion of a digital image of a test pattern.
Figure 3A:
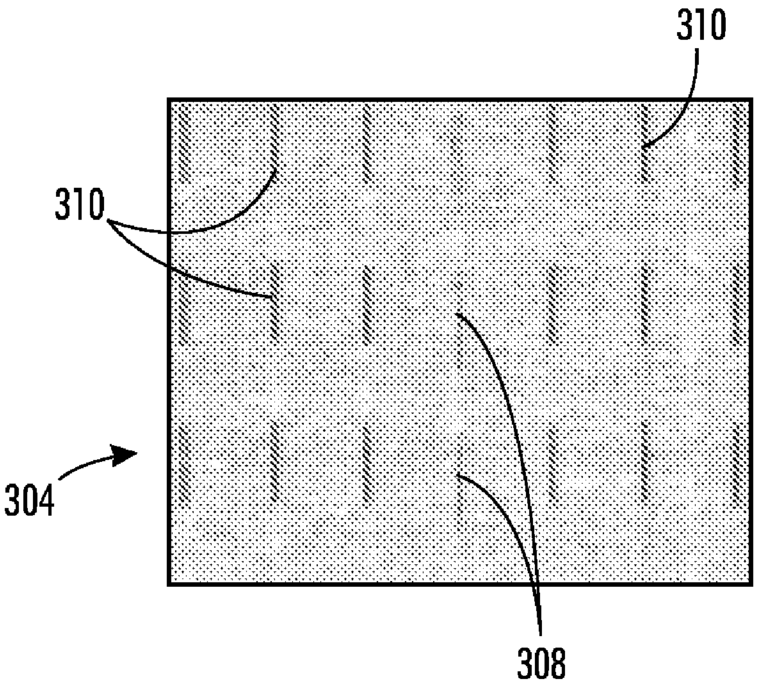
FIG. 3A is a portion of a digital image of a test pattern having evidence of a weak ink jet.
Figure 3B:
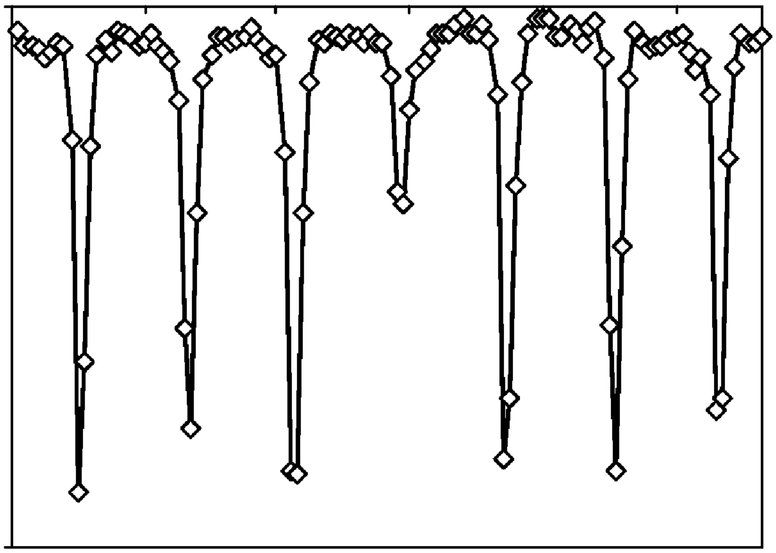
FIG. 3B is a profile of the data shown in the image of FIG. 3A.
Figure 4A:
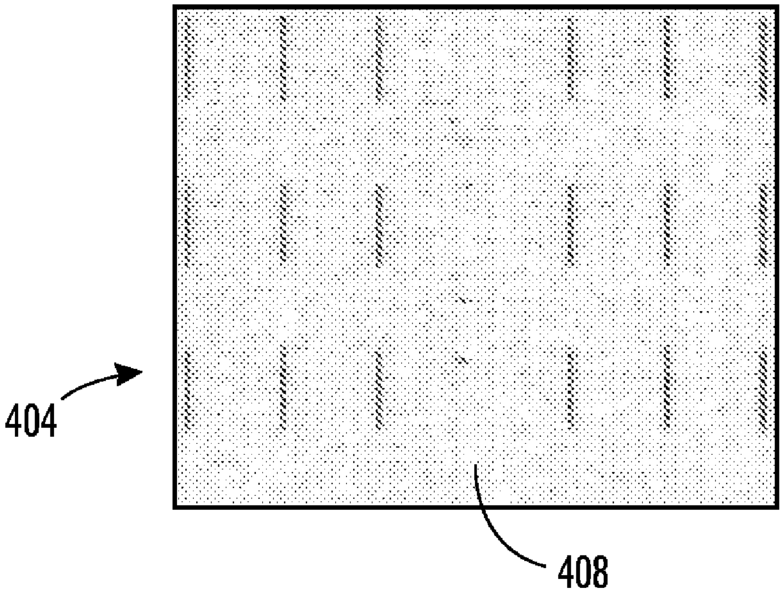
FIG. 4A is a portion of a digital image of a test pattern having evidence of a missing ink jet.
Figure 4B:
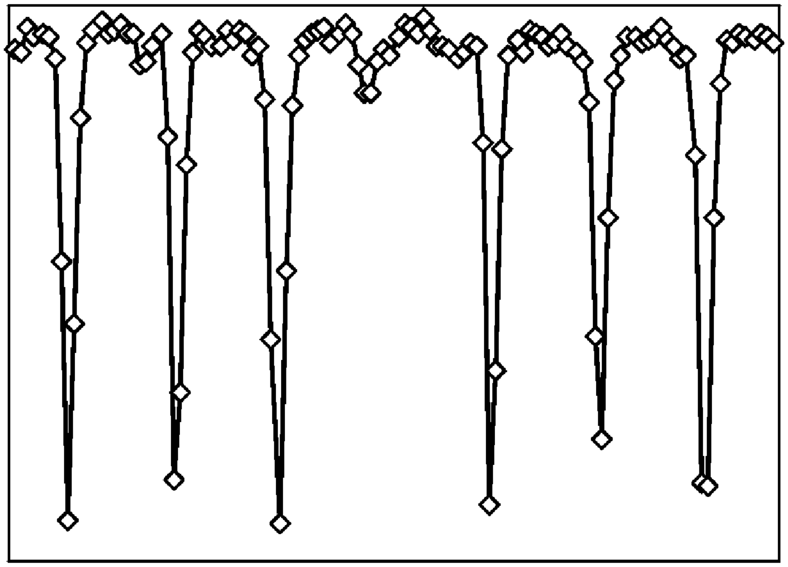
FIG. 4B is a profile of the data shown in the image of FIG. 4A.

A process for detecting missing and/or weak ink jets in a digital image of a test pattern is now described with reference to FIG. 2, FIGS. 3A and 3B, and FIGS. 4A and 4B. FIG. 2 shows a portion of a test pattern useful for detecting missing jets. The test pattern 204 is comprised of a series of vertical dashes 208. Each dash is generated by a single ink jet ejecting a series of ink drops as the image receiving member 38 is rotated by a printhead. Thus, the portion of the test image shown in FIG. 2 is generated by twenty-two ink jets. In FIG. 3A, a portion of a test pattern 304 is shown with the dashes 308 in the pattern being generated by a weak ink jet. The ink in the dashes 308 generates an electrical signal that has an amplitude that is closer to the amplitude for the signals generated for the areas of the image receiving member that do not have ink on them than the amplitudes for the signals generated for the other dashes 310. These amplitude differences and similarities are shown in FIG. 3B. Similarly, the portion of the test pattern 404 shown in FIG. 4 has area 408 where little or no ink was ejected by an ink jet. This digital image yields the amplitude profile shown in FIG. 4B.

In one embodiment, the photo detectors used to generate the digital image of the test pattern on the imaging member are implemented in an integrated circuit. Each integrated circuit provides 432 photo detectors and twelve integrated circuits are linearly arranged in the cross process direction to generate a digital image of the imaging member. At the boundaries of the integrated circuits, the circuits abut one another. A gap in photo detector coverage occurs at these boundaries. Consequently, the portion of the imaging member opposite the abutting boundaries is not imaged. When a dash pattern is located under one of these abutting regions, the resulting image, such as the image 504 in FIG. 5A only contains a portion of the dash pattern at that location. Thus, the photo detectors that obliquely image those areas generate an image that falsely resembles a dash formed by a weak jet such as the dash shown in FIG. 3A. Imaging the test pattern a second time after the support member on which the sensors are mounted has been moved by a distance that corresponds to the abutting boundaries of the integrated circuits providing the photo detectors yields a digital image of the dash that is more distinguishable. After the support member is moved a distance that corresponds to the boundary area in which no photo detector is located, the image of the test pattern is captured a second time. The second image 508 then properly captures the dash pattern since the pattern is no longer obscured by the gap at the abutting region of the sensor array. Instead the abutting region is placed at a region of interest that does not contain important information for the purpose of assembling the profile data to determine the presence of weak or missing jets. In one embodiment, the support member may be moved in response to the detection of one or more weak jets and the second digital image is processed to identify ink jets that were poorly positioned during the capture of the first image. In another embodiment, the support member on which the integrated circuits are mounted is moved at randomly generated distances and the digital image is processed to identify active ink jets that were previously identified as being weak.

Figure 5A:
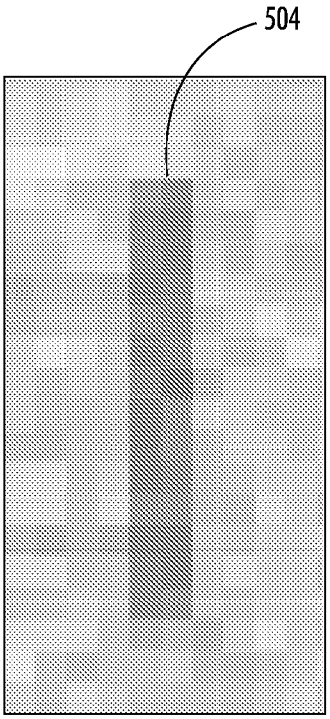
FIG. 5A is an image of a single dash in a test pattern that is located between two 600 dpi pixel elements within an image sensor.
Figure 5B:
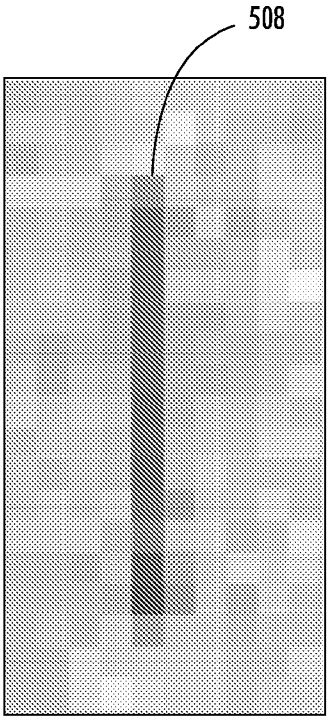
FIG. 5B is an image of the same dash shown in FIG. 5A after a support member has been moved to a position that represents one-half of a single 600 dpi pixel element in the sensor array.
Figure 6:
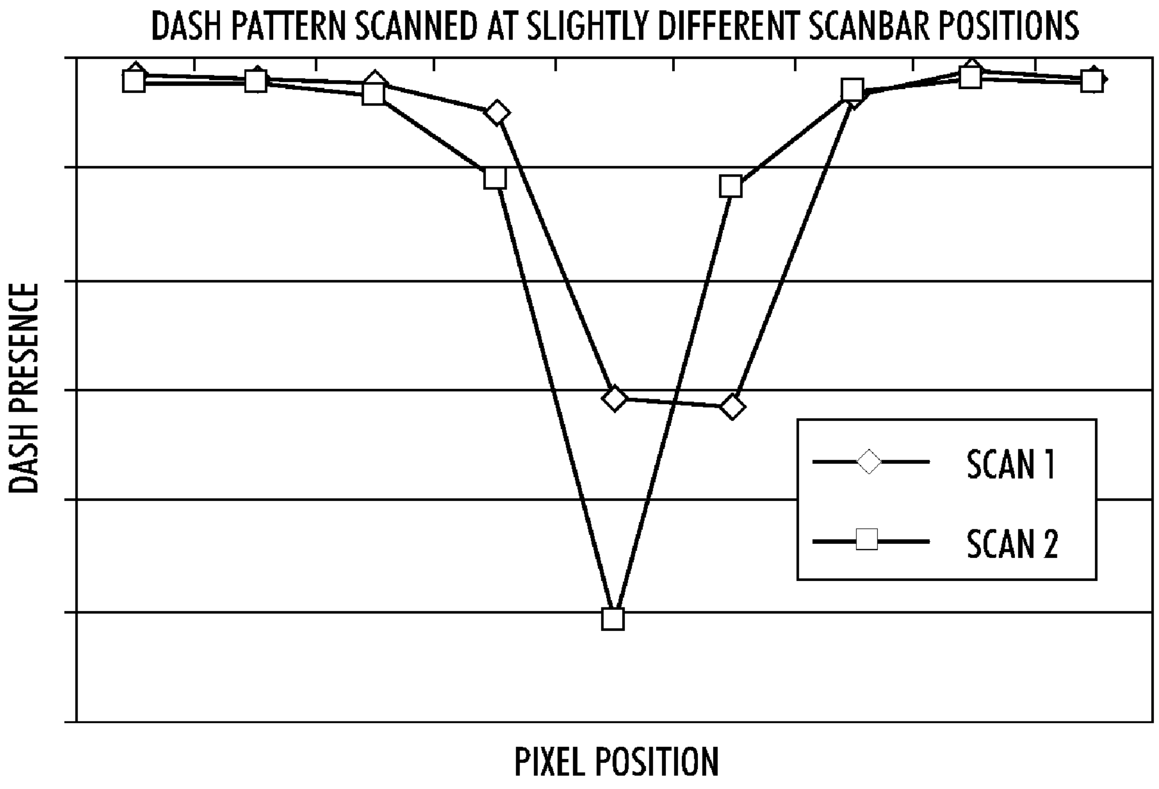
FIG. 6 is a graph of two profiles for the images shown in FIG. 5A and FIG. 5B.

The detection of weak or missing jets is now discussed with reference to FIG. 6. Amplitude profiles of the two images in FIGS. 5A and 5B are shown in FIG. 6. The amplitude values for the two images show the change in amplitude that can occur as a result of a slight positional difference of the sensor array at the time of acquisition. The profile labeled SCAN 2 in FIG. 6 appears to be darker then the profile labeled SCAN 1 when only considering the amplitude of the profile. However, closer consideration reveals that the position of the support member on which the sensors are mounted during SCAN1 was such that the darkest area of the dash pattern was sampled and integrated between two adjacent photo detectors. The profile for SCAN2, on the other hand, found the dash pattern under a single photo detector and is shown in FIG. 6 as a single darker point. Considering amplitude alone in this case would have falsely indicated a weak ink jet for SCAN 1 and an operational jet for SCAN 2 even though these samplings represent the same dash pattern scanned with the sensor array placed at slightly different locations relative to the imaging member. The two areas under the two profile curves are approximately the same. Thus, integrating an area under a profile curve for an ink jet in a digital image and comparing the area to a predetermined threshold is needed to identify properly the state of ink jets in a system where the dash pattern width is very close to the photo detector width within the sensor array. In another embodiment where fine motion control is possible, the support member may be moved at small intervals where new images are sampled and processed. These resultant profiles may then be processed using a feathering technique that recovers details of the image substrate at resolutions smaller than the actual photodetector spacing. In empirical tests, amplitude comparisons and integration comparisons are both useful and one test has not been conclusively shown to be better than the other test. Consequently, in one embodiment, the amplitudes of the profiles and the areas under the profile curves are computed and compared to predetermined thresholds. In this embodiment, both the amplitude and integration result must be greater than the predetermined thresholds before the ink jet is identified as being weak or missing.

Figure 7:
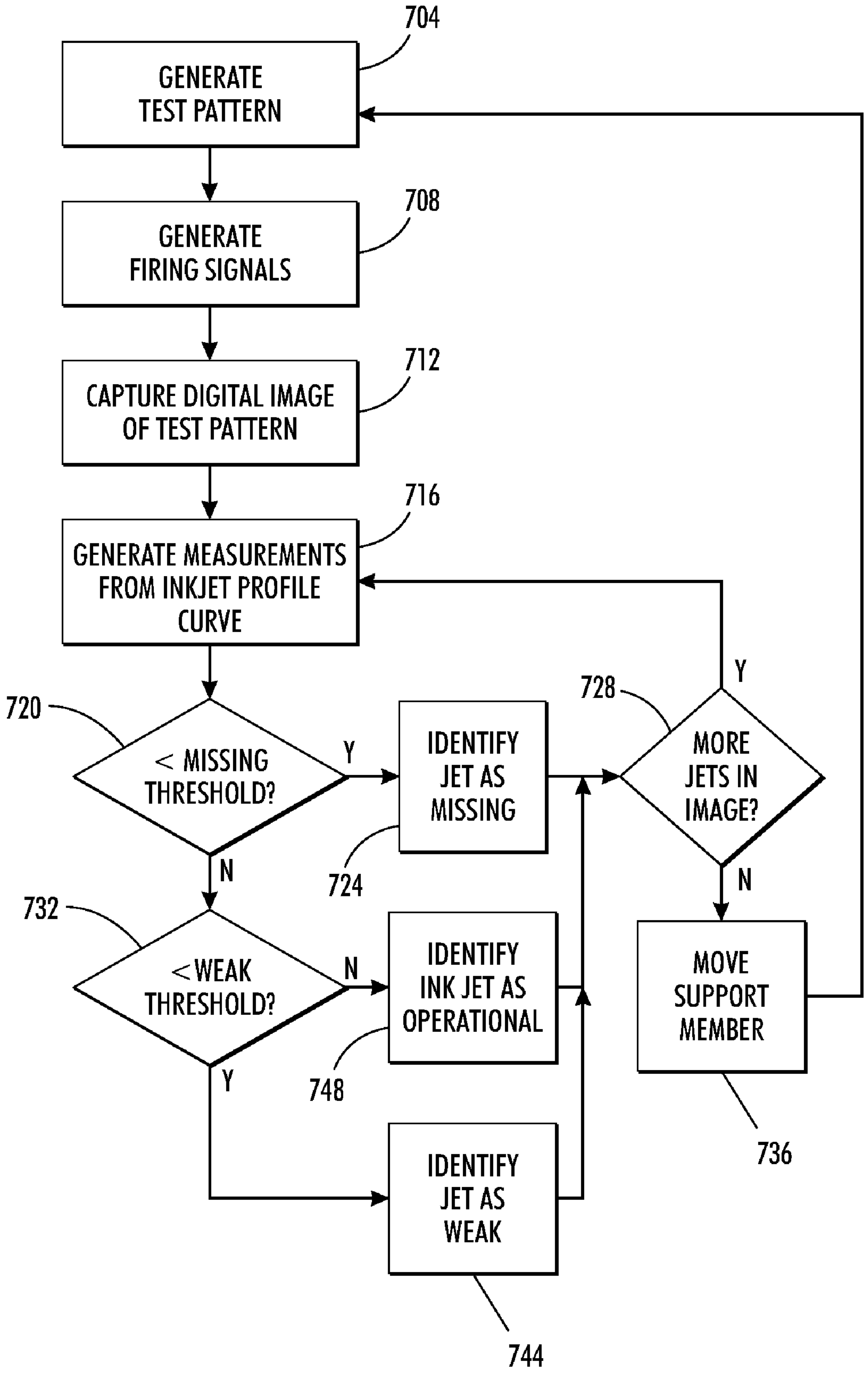
FIG. 7 is a flow diagram of a process for detecting missing ink jets and weak ink jets from digital images of test patterns on image receiving members.

A process for detecting weak and/or missing ink jets is shown in FIG. 7. The process begins with the generation of a test pattern (block 704), the use of the test pattern to generate firing signals for the ejection of ink onto the image receiving member (block 708), and the capture of a digital image of the test pattern on the image receiving member (block 712). The image evaluator of the controller generates an amplitude measurement and an area under a curve from the profile curve for each ink jet in the digital image (block 716). Each result is compared to an appropriate predetermined threshold for a missing ink jet (block 720) to determine whether the area indicates the ink jet is missing. If it is less than the threshold, the ink jet is identified as being a missing ink jet (block 724) and the process determines whether more ink jet areas are to be processed (block 728). If the dashes for other ink jets have not been processed, then the process selects the next ink jet area and generates the measurements from the ink jet profile (block 716). If the measurements are not less than the missing threshold, but less than the weak ink jet threshold (block 732), then the process identifies the ink jet as being weak (block 744). If the measurements obtained from the ink jet profile curve are not less than either the missing ink jet threshold or the weak ink jet threshold, then the ink jet is identified as being operational (block 748). After all the ink jets in the digital image have been processed (block 728), the controller generates a signal for the actuator to move the support member by a randomly generated distance (block 740). As noted above, this movement of the support member improves the imaging of the test pattern in the areas where the dashes were located opposite the boundary between integrated circuits mounted on the support member. After the support member is moved, another test pattern is generated (block 704) and processed (blocks 716 to 744).

In operation, the controller of an imaging system is configured with programmed instructions to print test patterns for detecting missing and/or weak jets. The instructions enable the image evaluator of the controller to analyze the digital images of the test pattern on the image receiving member to identify missing and weak ink jets. For weak ink jets, the support member to which the sensors are mounted is moved and a second image is captured. After this image is processed, those ink jets previously identified as being weak are reevaluated before the weak jet determination is finalized. In the identification process, an area in each digital image associated with an ink jet is integrated to determine the value that is compared to a predetermined threshold. During the life of the imaging system, the controller generates and images test patterns for analysis and detection of missing and weak ink jets in accordance with a schedule or in response to manual activation by a user or a customer service technician.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A system for evaluating image quality in an image generating system comprising:

a test pattern generator configured to generate test patterns formed with line segments in a process direction on an image receiving member, each line segment in a test pattern corresponding to one ink jet in a printhead;

a plurality of light sensors linearly arranged along a support member that is transverse to the process direction, the plurality of light sensors configured to generate a digital image of each generated test pattern on the image receiving member from light reflected by the test pattern on the image receiving member;

an image evaluator configured to generate a response for an ink jet that corresponds to a portion of each digital image of each test pattern on the image receiving member and to generate a measurement of an area under a profile of the response for an ink jet obtained from a digital image of a first test pattern on the image receiving member and from a digital image of a second test pattern on the image receiving member, the image evaluator including a comparator configured to compare the area measurement for the ink jet to a predetermined threshold to identify missing and weak ink jets in response to the area measurement for the ink jet being less than the predetermined threshold;

an actuator coupled to the support member, the actuator being configured to move the support member transversely to the process direction; and a controller coupled to the image evaluator and the actuator, the controller configured to generate a random number that corresponds to a distance to be moved by the support member and to couple the actuator to electrical power and move the support member transversely to the process direction by the distance to enable light sensors in the plurality of light sensors to generate a digital image of a boundary area between light sensors during generation of the digital image of the first test pattern on the image receiving member.

2. The system of claim 1, the image evaluator is further configured to generate an amplitude measurement of the profile of the response for the ink jet; and the comparator is further configured to compare the amplitude measurement for the ink jet to a second predetermined threshold to identify the ink jet as being weak or missing in response to the amplitude measurement for the ink jet being less than the second predetermined threshold.

3. The system of claim 1, the image evaluator is further configured to generate a measurement of an amplitude of the profile of the response for the ink jet; and the comparator is further configured to compare the area measurement for the ink jet to the predetermined threshold and to compare the amplitude measurement for the ink jet to a second predetermined threshold, the image evaluator identifying the ink jet as being weak or missing in response to both of the area measurement and the amplitude measurement for the ink jet being less than the predetermined threshold and the second predetermined threshold, respectively.

4. The system of claim 1, the plurality of light sensors further comprising:

a plurality of integrated circuits linearly arranged along the support member.

5. The system of claim 4 wherein the distance that the support member is moved is at least as large as a boundary area between adjacent integrated circuits on the support member.

6. A method for detecting weak or missing ink jets in an ink jet image generating system comprising:

generating a first test pattern of line segments in a process direction on an image receiving member with each line segment corresponding to one ink jet in a printhead;

generating a digital image of the generated first test pattern on the image receiving member from light reflected by the test pattern and the image receiving member to a plurality of light sensors linearly arranged on a support member that is transverse to the process direction;

generating a response profile for a portion of the image receiving member on which the first test pattern was generated;

measuring an area under the response profile corresponding to the first test pattern;

comparing the measurement of the area under the response profile corresponding to the first test pattern to a predetermined threshold;

identifying missing and weak ink jets in response to the measurement of the response profile corresponding to the first test pattern being less than the predetermined threshold;

generating a random number that corresponds to a distance to move the support member;

moving the support member transversely across the process direction by the distance corresponding to the random number to enable light sensors in the plurality of light sensors to generate a digital image of a boundary area between light sensors during generation of the digital image of the first test pattern on the image receiving member;

generating a second test pattern of line segments in a process direction on an image receiving member with each line segment corresponding to one ink jet in a printhead;

generating a second digital image of the generated test pattern on the image receiving member from light reflected by the test pattern and the image receiving member to a plurality of light sensors linearly arranged on a support member that is transverse to the process direction;

generating a response profile for a portion of the image receiving member on which the second test pattern was generated;

measuring an area under the response profile corresponding to the second test pattern;

comparing the measurement of the area under the response profile corresponding to the second test pattern to the predetermined threshold;

identifying missing and weak ink jets in response to the measurement of the area under the response profile corresponding to the second test pattern being less than the predetermined threshold; and reevaluating with reference to the response profile corresponding to the second test pattern the ink jets identified as being weak or missing with reference to the response profile corresponding to the first test pattern.

7. The method of claim 6 further comprising:

generating an amplitude measurement of the response profile corresponding to the first test pattern and an amplitude measurement corresponding to the second test pattern for the ink jet; and comparing the amplitude measurements for the ink jet that correspond to the first test pattern and to the second test pattern to a second predetermined threshold to identify the ink jet as being weak or missing in response to the amplitude measurements for the ink jet being less than the second predetermined threshold.

8. The method of claim 6 further comprising:

generating for the ink jet a measurement of an amplitude of the response profile corresponding to the first test pattern and a measurement of an amplitude of the response profile corresponding to the second test pattern for the ink jet;

comparing the amplitude measurements for the ink jet to a second predetermined threshold; and identifying an ink jet as being weak or missing in response to both of the area measurements and the amplitude measurements for the ink jet being less than the predetermined threshold and the second predetermined threshold, respectively.

9. The method of claim 6 wherein the support member is moved a distance that is at least as large as a boundary area between adjacent integrated circuits on the support member.

* * * * *